(12) United States Patent
Williams

(10) Patent No.: US 7,370,601 B1
(45) Date of Patent: May 13, 2008

(54) WHISTLE STRUCTURES

(76) Inventor: Mark E. Williams, P.O. Box 343, Lively, VA (US) 22507

( * ) Notice: Subject to any disclaimer, the term of this patent is extended or adjusted under 35 U.S.C. 154(b) by 0 days.

(21) Appl. No.: 11/283,976

(22) Filed: Nov. 21, 2005

(51) Int. Cl.
A01M 29/02 (2006.01)

(52) U.S. Cl. .................. 116/22 A; 116/137 R; 340/384.1

(58) Field of Classification Search ........... 116/22 A, 116/137 R; 340/384.1, 384.2
See application file for complete search history.

(56) References Cited

U.S. PATENT DOCUMENTS

| | | |
|---|---|---|
| 4,150,637 A | 4/1979 | Penick |
| 4,437,428 A | 3/1984 | Hoffelner |
| 4,903,630 A | 2/1990 | Rezmer |
| 4,998,091 A | 3/1991 | Rezmer |
| D327,866 S | 7/1992 | Maubray |
| 5,308,134 A | 5/1994 | Stanesic |
| D353,117 S | 12/1994 | Schenken et al. |
| 5,382,070 A | 1/1995 | Turner |
| 5,403,059 A | 4/1995 | Turner |
| 5,418,518 A | 5/1995 | Schenken et al. |
| D390,147 S | 2/1998 | Hartmann et al. |
| 5,969,593 A | 10/1999 | Will |
| 6,056,411 A | 5/2000 | Blevins |
| 6,677,853 B1 | 1/2004 | Canfield |
| 2005/0040935 A1 | 2/2005 | Ewert et al. |

OTHER PUBLICATIONS

Brown, J., "DEERPRUDENCE—Conclusive evidence is lacking, but vehicles keep whistling", AAA World, Sep./Oct. 2004, p. 37.
"Deer Alert" packaging and instructions, Custom Accessories, Inc., Niles, Illinois, 2000.
"Window Accessories", "In-Channel Ventvisor Deflector", "Ventshade Deflector", and "Ventvisor Delfector", printed from on Nov. 19, 2005, 5 pp.
"Hood Shields", printed from on Nov. 19, 2005, 2 pp.
"Wind Deflectors", "Window Deflectors—Side Window Deflector", "Bug Deflector, Bug Guards by Lund", "Window Deflectors—side window air deflectors for autos", and "Product Image" for Bugflector II.

Primary Examiner—Richard Smith
Assistant Examiner—Tania C Courson
(74) Attorney, Agent, or Firm—Leading-Edge Law Group, PLC; James T. Beran

(57) ABSTRACT

Devices that emit sound audible to nearby animals can include a deflection structure or other support structure and, connected to it, at least one whistle structure. The deflection structure can, for example, be a rain guard, an insect deflector, or a rock deflector. It can, for example, have an air flow surface across which air flows when the vehicle on which it is mounted moves at normal operating speeds, and whistle structures can be activated by the air flow.

9 Claims, 3 Drawing Sheets

WHISTLE STRUCTURES

BACKGROUND OF THE INVENTION

The present invention relates generally to whistles, and more particularly to structures that can be mounted on vehicles to emit sound audible to nearby animals.

Various devices have been proposed for providing sound to alert animals of an approaching vehicle. U.S. Pat. No. 6,056,411, for example, describes a realignment device for a vehicle side mirror that, in one embodiment, forms a whistle designed to emit sounds at wavelengths audible to animals. Other examples are described in U.S. Pat. Nos. 4,150,637; 4,437,428; 4,903,630; 5,418,518; and 5,969,593.

It would be advantageous to have improved techniques for whistles on vehicles that emit sound audible to nearby animals.

SUMMARY OF THE INVENTION

The invention provides various exemplary embodiments, including devices, methods, and vehicles. In general, the embodiments are implemented with whistle structures that emit sound audible to nearby animals.

These and other features and advantages of exemplary embodiments of the invention are described below with reference to the accompanying drawings.

DETAILED DESCRIPTION

Figure 1:
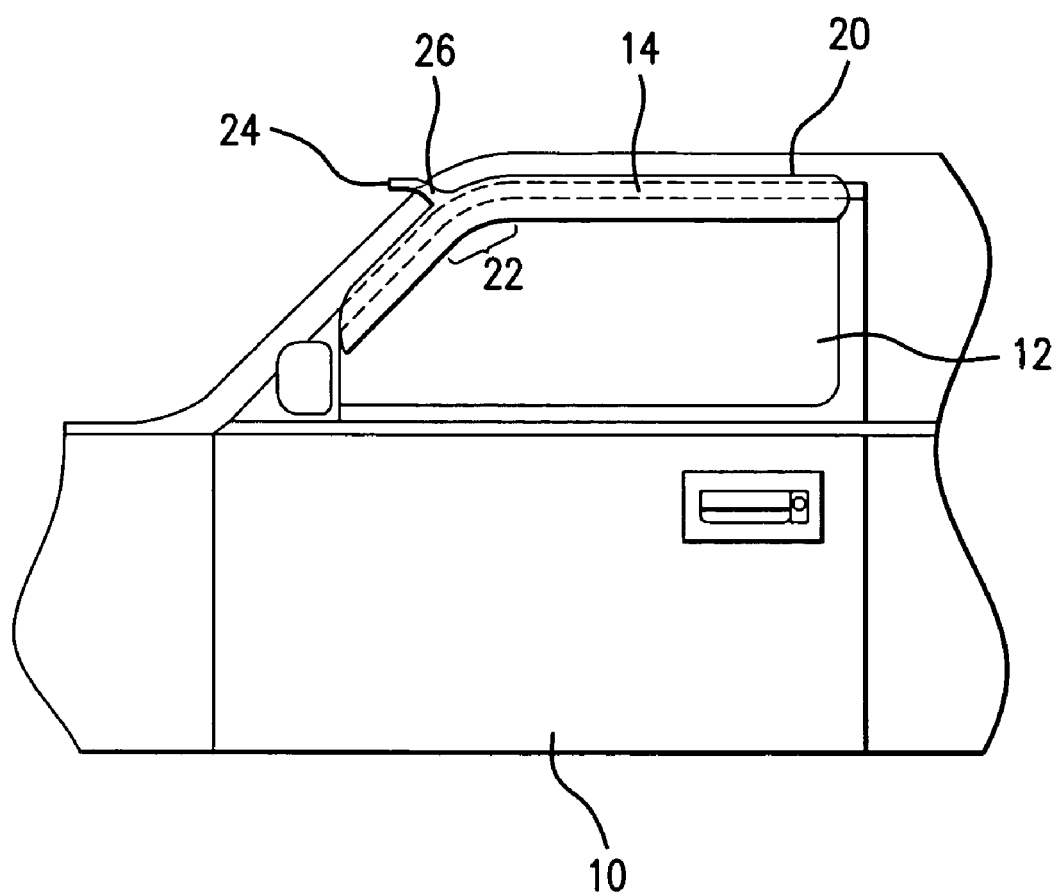
FIG. 1 is a side view of a portion of a vehicle showing a rain guard mounted over a window with a whistle structure connected to the rain guard.

In the following detailed description, numeric values and ranges are provided for various aspects of the implementations described. These values and ranges are to be treated as examples only, and are not intended to limit the scope of the claims. In addition, a number of materials are identified as suitable for various facets of the implementations. These materials are to be treated as exemplary, and are not intended to limit the scope of the claims.

The term "vehicle" is used herein to include any vehicle that may be operated in an area in which animals are nearby. Examples of vehicles include cars, trucks, motorcycles, and other motor vehicles that are operated on roads, but various other types of vehicles could also be used.

A vehicle is treated herein as having a "vehicle body" or simply "body", meaning the main part of the vehicle to which other structures may be connected, either directly or through intermediate structures. The "exterior" of the vehicle refers to the part of the vehicle that is disposed outward from the center of the vehicle. The "center line" of the vehicle refers to a horizontal line through the center of the vehicle and extending in the usual direction of movement. The "forward" and "rear" of a vehicle refer respectively to an end of the vehicle disposed toward usual direction of movement and the opposite end. A vehicle's "length" is measured in a horizontal direction parallel to its center line, while its "width" is measured in a horizontal direction perpendicular to the center line, also referred to as a "lateral direction".

Various structures may be "mounted" on a vehicle or on the vehicle's exterior, meaning that the structures are attached to the vehicle such that they are supported by a portion of the vehicle's body. Examples include rain guards, insect deflectors, rock deflectors, wing-like structures for deflecting airflow, air scoops, wind deflectors, and various other structures.

A structure that can be mounted on a vehicle is referred to herein as a "deflection structure" if it performs a deflecting function by deflecting objects, substances, or other items away from some part of a vehicle on which it is mounted. For example, a rain guard deflects precipitation such as rain from above a window of a vehicle, preventing rain from entering even if the window is open. Similarly, insect and rock deflectors deflect insects and rocks, respectively, reducing the likelihood that the deflected objects will impact windows or other portions of the vehicle.

A "whistle structure" or "whistle" is a structure that, in response to airflow, produces sound. The sound produced by a whistle structure may be in the frequency range audible to humans or it may be in a higher or lower frequency range audible only to non-human animals, referred to herein simply as "animals". For example, it could be an ultrasonic sound at a frequency higher than the upper limit of human auditory perception.

Various products are available for mounting whistles on a vehicle to alert deer or other animals to the vehicle's approach. Many of these devices are mounted directly to the vehicle, which can cause problems. Some of the implementations described below, however, provide techniques in which a whistle structure is connected to a deflection structure, and the deflection structure is mounted on a vehicle. For example, the whistle structure can be connected to and extend forward from the forward end of a rain guard, making it unnecessary to separately mount the whistle structure on the vehicle. Similarly, the whistle structure can be connected to an insect or rock deflector, in which case a separate mounting is similarly unnecessary.

Another problem with whistle structures is the need for appropriate airflow. Some of the implementations described below provide whistle structures connected to a support structure that has an "air flow surface", meaning a surface across which air flows when the vehicle moves. A whistle structure is "activated" to emit sound by a portion of the flowing air if the whistle structure produces sound in response to the flowing air. Furthermore, the whistle structure emits sound when the vehicle moves "at normal operating speeds" if the whistle structure is activated by the flow of air that occurs when the vehicle is moving within some part of its normal speed range. For example, the normal speed range for operating a motor vehicle on a road or highway could be between 10 and 70 miles per hour; in this case, a whistle structure would emit sound when the vehicle moves at normal operating speeds if it emits sound within any part of the normal speed range.

A whistle structure can be connected to a deflection structure or other support structure in any suitable way. In some of the implementations described below, a whistle structure and a deflection structure or other support structure are "molded as one piece", meaning that the structures include artifacts of a molding or other process by which both structures were produced from the same material substantially at the same time, with no need for further attachment or other connection between them.

Sound emitted or otherwise produced by a whistle structure is "audible" to an animal when the animal's behavior correlates somehow with the sound. The correlation need not be perfect, provided that the presence of the sound increases the likelihood that the behavior will change. Examples of behavior that would indicate that the sound is audible include a startle or flight response or other behavior indicating surprise or aversion produced by the sound.

An animal is "nearby" to a vehicle with a whistle structure if the animal is close enough to the vehicle that (1) sound from the whistle structure would be audible to the animal if it had normal hearing, and (2) a collision could occur between the animal and the vehicle on its current course and speed if the animal moves at its maximum speed. In other words, a nearby animal is an animal that should be able to hear the whistle structure's sound and that could collide with the vehicle if the vehicle continues on its current course and speed.

FIG. 1 shows a portion of a vehicle such as a car, pickup truck, or other truck. The illustrated portion of the vehicle includes door 10 in which window 12 is mounted. As is conventional, window 12 may be raised or lowered between fully closed and fully open positions. It is often desirable, however, to leave window 12 in a slightly open position as illustrated to allow airflow through a small opening such as opening 14.

In FIG. 1, rain guard 20 is mounted around the upper side of window 12, positioned above the upper part of opening 14. Rain guard 20 therefore deflects precipitation such as rain from above window 12, so that rain does not enter opening 14.

The part of rain guard 20 along the uppermost side of window 12 has a forward end 22 disposed in the direction of forward motion of the vehicle. Whistle 24 is connected to forward end 22 by connecting part 26. Because whistle 24 is relatively high and extends forward at least 1" or more from forward end 22, it receives relatively clear air flow, causing it to emit sound audible to nearby animals. As a result, a nearby animal may respond to the sound in a way that avoids a collision with the vehicle.

Rain guard 20 can be structured in the same manner as various commercially available rain guards, such as one of the products from Lund International's Auto Ventshade or MacNeil Automotive Products Ltd.'s WeatherTech®. In addition to its function to deflect precipitation, rain guard 20 can have a tint or color that reduces the amount of sunlight entering the vehicle through window 12. Whistle 24 can be shaped and structured like a conventional deer whistle as described, for example, in U.S. Pat. No. 4,437,428, incorporated herein by reference. Although it is desirable to mold whistle 24, connecting region 26, and rain guard 20 in a single, structurally sturdy plastic piece using conventional molding techniques, whistle 24 could be attached to rain guard 20 in any other suitable way.

Figure 2:
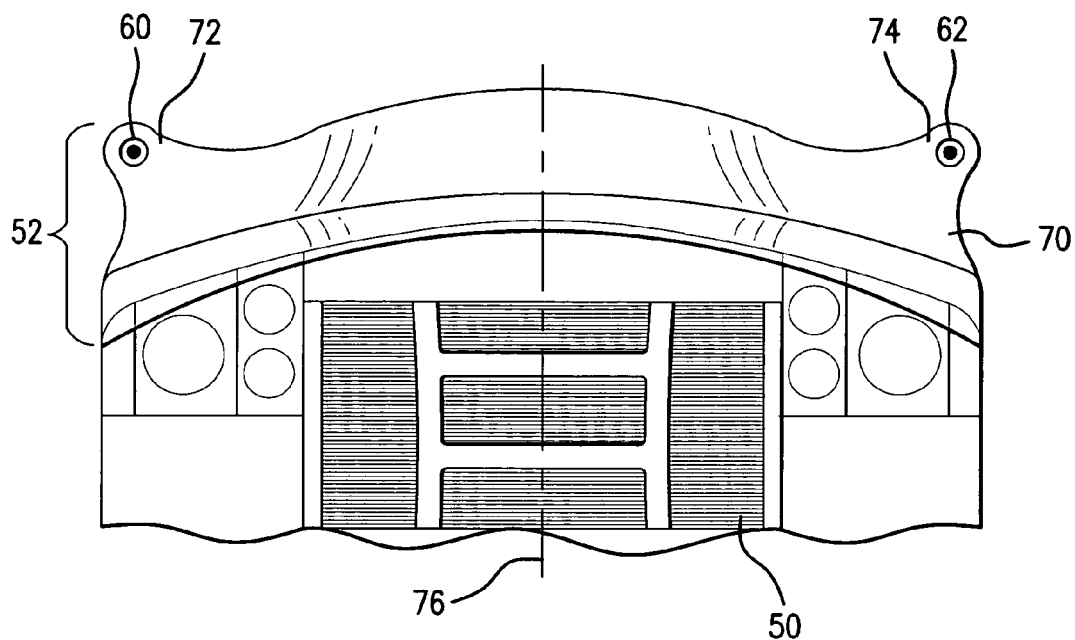
FIG. 2 is a front view of a truck with an insect or rock deflector over the grille and with whistle structures connected to the deflector.

FIG. 2 shows another portion of a vehicle such as a large pickup truck or other truck. The illustrated portion of the vehicle includes grille 50 over which deflector 52 is mounted. Deflector 52 can, for example, be similar to the bug and gravel shield disclosed in U.S. Pat. No. 5,308,134, incorporated herein by reference, or could be implemented as any other deflector or air flow structure mounted on a vehicle. It is conventional to mount deflectors similar to deflector 52 on the front of a truck to deflect insects, rocks, and other items that would otherwise impact windows and other portions of the vehicle.

Deflector 52 illustratively includes whistles 60 and 62 connected to its upper portion 70, although whistles similar to whistles 60 and 62 could be mounted in various other positions on or in deflector 52. Whistles 60 and 62 are mounted respectively on the upper left and upper right corners of upper part 70 by connecting parts 72 and 74, and are approximately symmetrical with respect to the vehicle's center line 76. Like whistle 24 in FIG. 1, whistles 60 and 62 can be shaped like a conventional deer whistle as described, for example, in U.S. Pat. No. 4,437,428, incorporated herein by reference. Whistles 60 and 62 extend upward from upper part 70, and therefore receive relatively clear air flow, causing them to emit sound audible to nearby animals. As a result, a nearby animal may respond to the sound in a way that avoids a collision with the vehicle.

Figure 3:
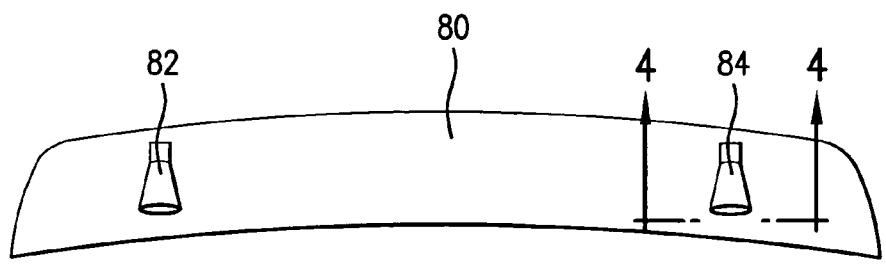
FIG. 3 is a front view of the upper part of another implementation of an insect or rock deflector with whistle structures.

FIG. 3 shows another implementation of the upper portion of a deflector similar to deflector 52 in FIG. 2. Upper portion 80 illustratively includes whistles 82 and 84. In other respects, the deflector shown in FIG. 3 can be the same as deflector 52 in FIG. 2.

Whistles 82 and 84 are also implemented in a high air flow region, but directly on the surface of upper part 80 and approximately symmetrically positioned. They may be positioned to obtain the maximum air flow resulting from the shape of the deflector, a position that can be determined by conventional techniques. Rather than being a complete whistle like whistles 60 and 62, however, each of whistles 82 and 84 can be structured as a part of a complete whistle, such as one-half of a conventional deer whistle as described, for example, in U.S. Pat. No. 4,437,428, incorporated herein by reference.

Figure 4:
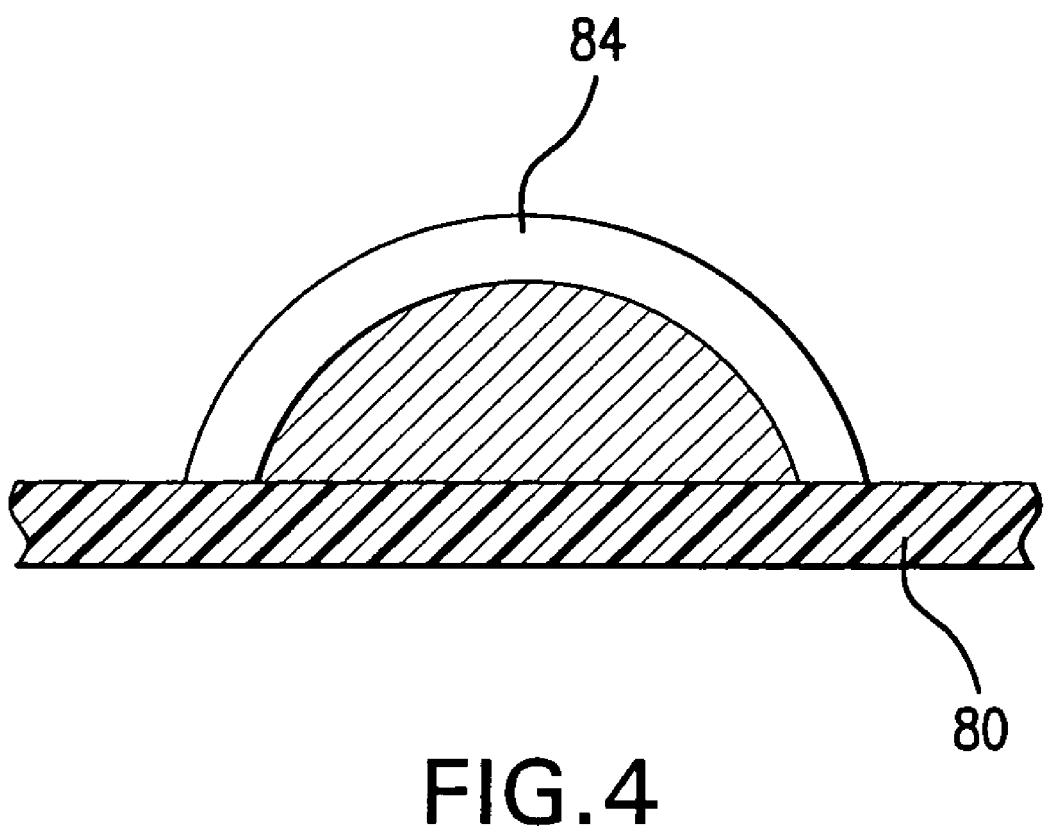
FIG. 4 is a cross-section view of the deflector of FIG. 3, taken along the line 4-4.

FIG. 4 shows a cross-sectional view of part 80 along line 4-4 in FIG. 3, illustrating how whistle 84 appears from below, the side from which air flow enters. The upper part of each of whistles 82 and 84 can be shaped in any suitable way for desired air flow. Because of the high air flow across upper part 80, whistles 82 and 84 receive strong air flow, causing each of them to emit sound audible to nearby animals. As a result, a nearby animal may respond to the sound in a way that avoids a collision with the vehicle.

Whistles 60, 62, 82, and 84 could be attached to a deflector in any suitable way. Although it is desirable to mold each of whistles 60 and 62, 82, and 84, connecting parts 72 and 74 (if any), and the remainder of a deflector in a single, structurally sturdy plastic piece using conventional molding techniques, whistles 60, 62, 82 and 84 could be attached to a deflector in any other suitable way.

The implementations in FIGS. 1-4 illustrate examples of a device that includes a deflection structure and, connected to the deflection structure, at least one whistle structure that emits sound audible to nearby animals. The deflection structure performs a deflecting function relative to a vehicle on which it is mounted. For example, the deflection structure can be a rain guard, an insect deflector, or a rock deflector.

In specific implementations similar to that in FIG. 1, the deflection structure includes a part that has a forward end disposed to the vehicle's front, and the whistle structure is connected to and extends forward from the forward end of the part.

In specific implementations as in FIGS. 3 and 4, the deflection structure has an air flow surface across which air flows when the vehicle moves at normal operating speeds. Each whistle structure is activated by a portion of the air flowing across the air surface to emit sound audible to nearby animals. For example, two or more whistle structures could be connected to the deflection structure. Also, the deflection structure could deflect at least one of insects and rocks.

Implementations as in FIGS. 3 and 4 also illustrate examples of a device that includes a support structure and, connected to the support structure, one or more whistle structures. The support structure is adapted to be mounted on a vehicle's exterior, and has an air flow surface across which air flows when a vehicle on which it is mounted moves. Each of the whistle structures is activated to emit sound by a respective portion of the air that flows across the air flow surface at normal operating speeds. The emitted sound is audible to nearby animals.

In more specific implementations as in FIGS. 3 and 4, the support structure also performs a deflecting function relative to the vehicle. Also, two or more whistle structures can be connected to the support structure. Where the support structure extends laterally across the vehicle's width, the whistle structures can be positioned approximately symmetrically with respect to the vehicle's center line. As above, the support structure could be an insect deflector or a rock deflector.

The techniques described in relation to FIGS. 1-4 also illustrate examples of a method to alert animals to approach of a vehicle. The method includes mounting a device on the vehicle and driving the vehicle. The device includes a deflection structure as described above and, connected to the deflection structure, at least one whistle structure as described above. When the vehicle is driven, each whistle structure emits sound.

The techniques described above in relation to FIGS. 3 and 4 also illustrate examples of another method that includes mounting a device on a vehicle's exterior and driving the vehicle at normal operating speed. The device includes a support structure with an air flow surface as described above, and, connected to the support structure, one or more whistle structures. Each whistle structure is activated to emit a sound by a respective portion of the air flowing across the air flow surface at normal operating speeds. The sound is audible to nearby animals.

The implementations of FIGS. 1-4 also illustrate examples of vehicles that include a vehicle body and, connected to the vehicle body or its exterior, a deflection structure or a support structure. Connected to the deflection structure or support structure are one or more whistle structures as described above.

The techniques described above in relation to FIGS. 1-4 are advantageous because they make it possible to provide a deer whistle or other animal-alerting whistle structure as part of a convenient add-on to a vehicle. For example, rain guards and similar products are mass marketed through auto parts stores, with specific types being available for specific years and makes of cars or pickup trucks. In addition, the structures described above allow enhanced air flow through whistle structures, and each device can be structured to maximize air flow through whistle structures at normal operating speeds. Finally, in case of malfunction or breakage, a device as described above could be easily replaced.

The exemplary implementations described above are illustrated with specific shapes, dimensions, and other characteristics, but the scope of the invention includes various other shapes, dimensions, and characteristics. For example, the particular shape of the whistle structures, deflection structures, and support structures could be different, and could be of appropriate sizes for any particular vehicle or band of sound emission. Furthermore, rather than being molded in one piece from plastic, the device as described above could be manufactured in various other ways and could include various other materials.

Similarly, the exemplary illustrations described above include specific examples of whistle structures, but any appropriate whistle structure could be employed. Further, the above exemplary implementations employ specific deflection structures and support structures, but a wide variety of other such structures could be used within the scope of the invention. The invention is not limited to the specific examples of rain guards, insect deflectors, and rock deflectors, but could be used with other structures that perform a deflecting function or that have suitable air flow surfaces.

While the invention has been described in conjunction with specific exemplary implementations, it is evident to those skilled in the art that many alternatives, modifications, and variations will be apparent in light of the foregoing description. Accordingly, the invention is intended to embrace all other such alternatives, modifications, and variations that fall within the spirit and scope of the appended claims.

What is claimed is:

1. A device comprising:
   a deflection structure that can be mounted on a vehicle; the deflection structure performing a deflecting function relative to a vehicle on which it is mounted; the deflection structure having an air flow surface across which air flows when a vehicle on which it is mounted moves; the deflection structure extending laterally across the vehicle's width; and
   connected to the deflection structure, two or more whistle structures; two of the whistle structures being positioned approximately symmetrically with respect to the vehicle's center line and each being activated to emit sound by a respective portion of the air flowing across the air flow surface when the vehicle moves at normal operating speeds; the sound emitted by each of the two whistle structures being audible to nearby animals.

2. The device of claim 1 in which the deflection structure is an insect deflector or a rock deflector.

3. A method of using the device of claim 1 to alert animals to approach of a vehicle, comprising:
   mounting the device on the vehicle; and
   driving the vehicle with each whistle structure emitting sound.

4. A vehicle comprising the device of claim 1, the vehicle further comprising:
   a vehicle body; the deflection structure of the device being connected to the vehicle body.

5. A device comprising:
   a support structure adapted to be mounted on a vehicle's exterior; the support structure having an air flow surface across which air flows when a vehicle on which it is mounted moves; the support structure extending laterally across the vehicle's width; and
   two or more whistle structures, each connected to the support structure, two of the whistle structures being positioned approximately symmetrically with respect to the vehicle's center line and each being activated to emit sound by a respective portion of the air flowing across the air flow surface when the vehicle moves at normal operating speeds; the sound emitted by each of the two whistle structures being audible to nearby animals.

6. The device of claim 5 in which the support structure performs a deflecting function relative to the vehicle on which it is mounted.

7. The device of claim 5 in which the support structure is an insect deflector or a rock deflector.

8. A method of using a device as in claim 5 to alert animals to approach of a vehicle, comprising:
   mounting the device on the vehicle's exterior; and
   driving the vehicle at a normal operating speed.

9. A vehicle comprising the device of claim 5, the vehicle further comprising:
   a vehicle body; the support structure of the device being connected to the vehicle body's exterior.

\* \* \* \* \*